April 20, 1948.  V. E. MATULAITIS  2,440,055
POWER TRANSMISSION
Filed Nov. 14, 1940     5 Sheets-Sheet 1
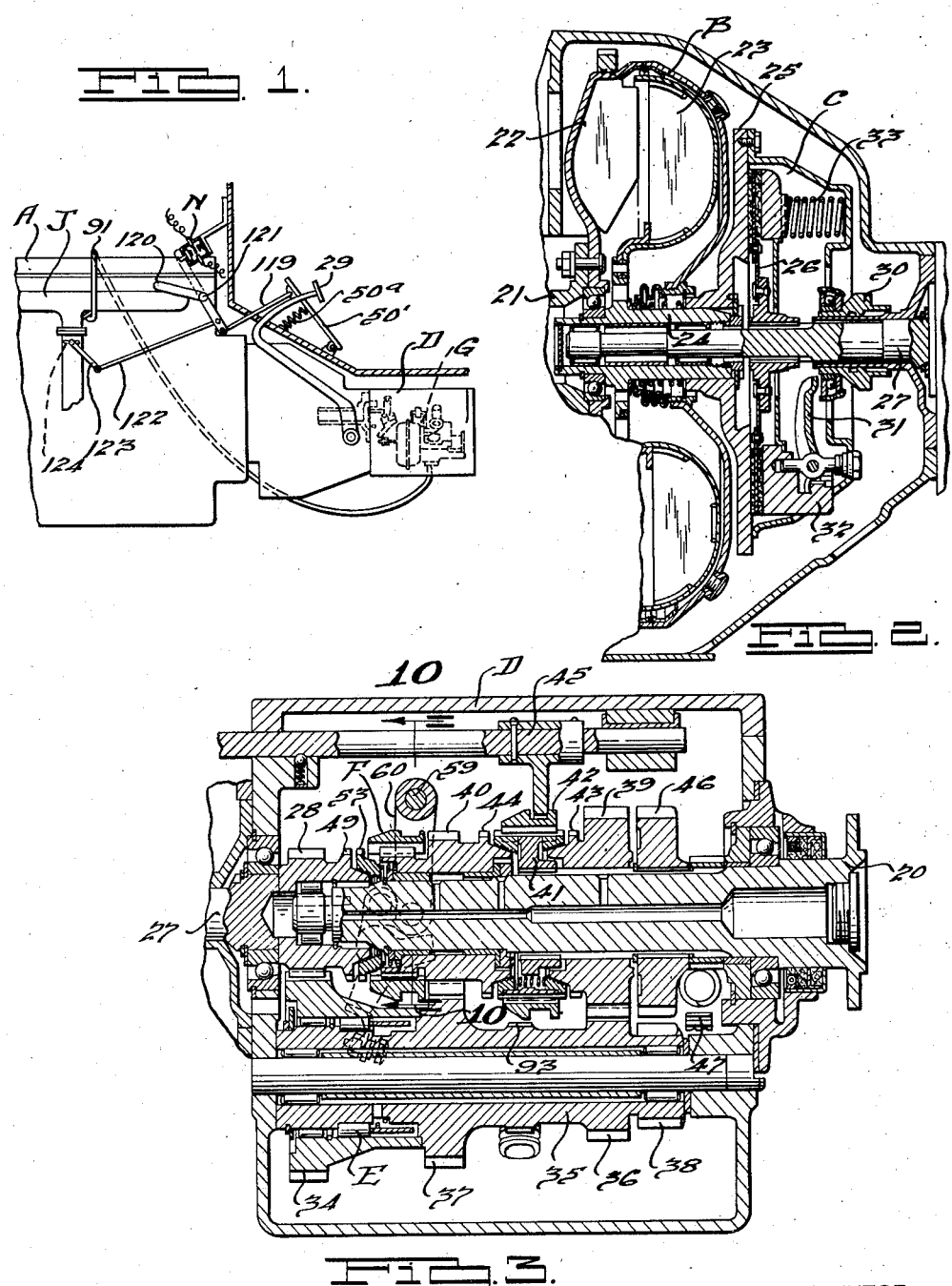
INVENTOR
Victor E. Matulaitis.
BY
Harness, Dick, Patee & Harris
ATTORNEYS.

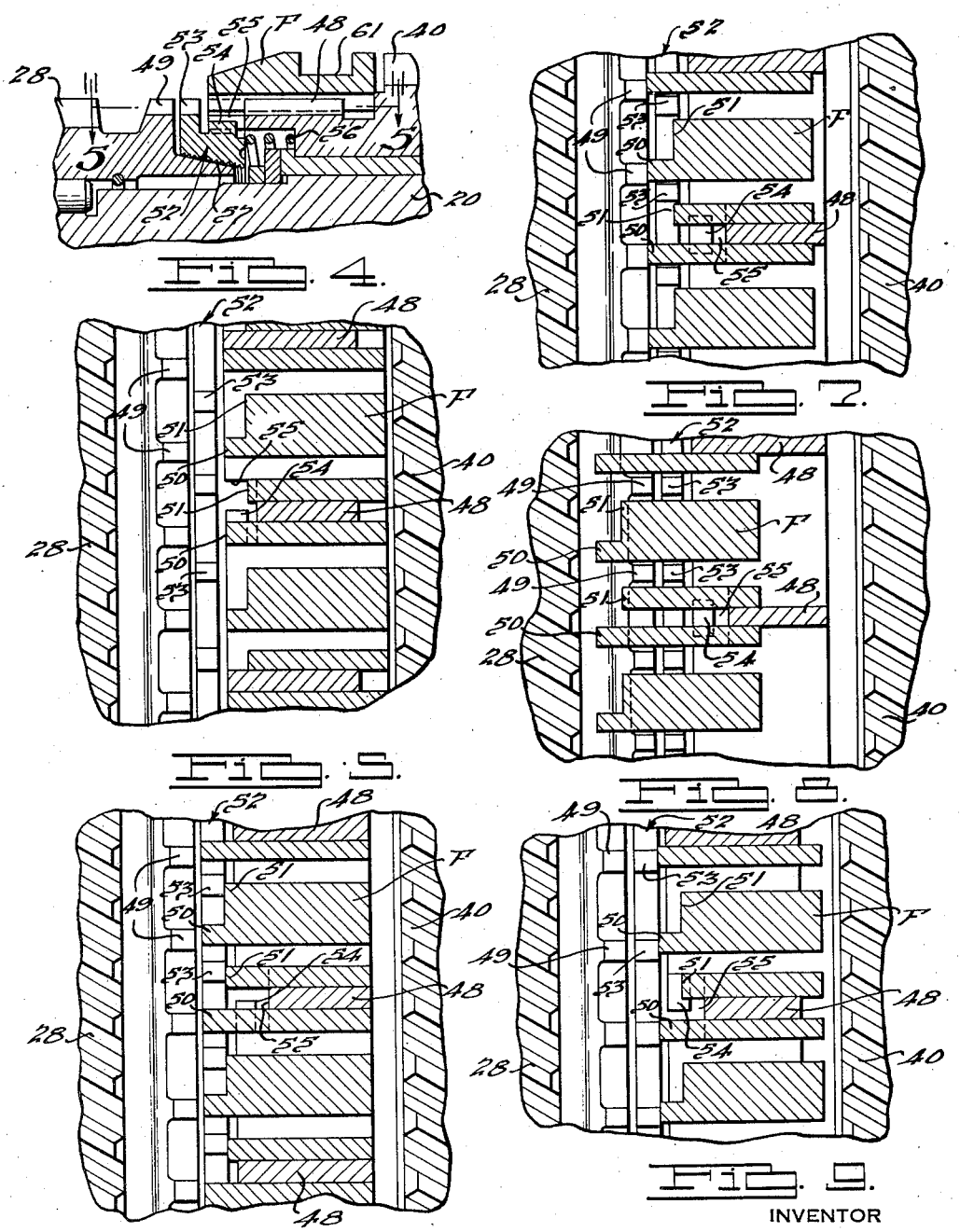

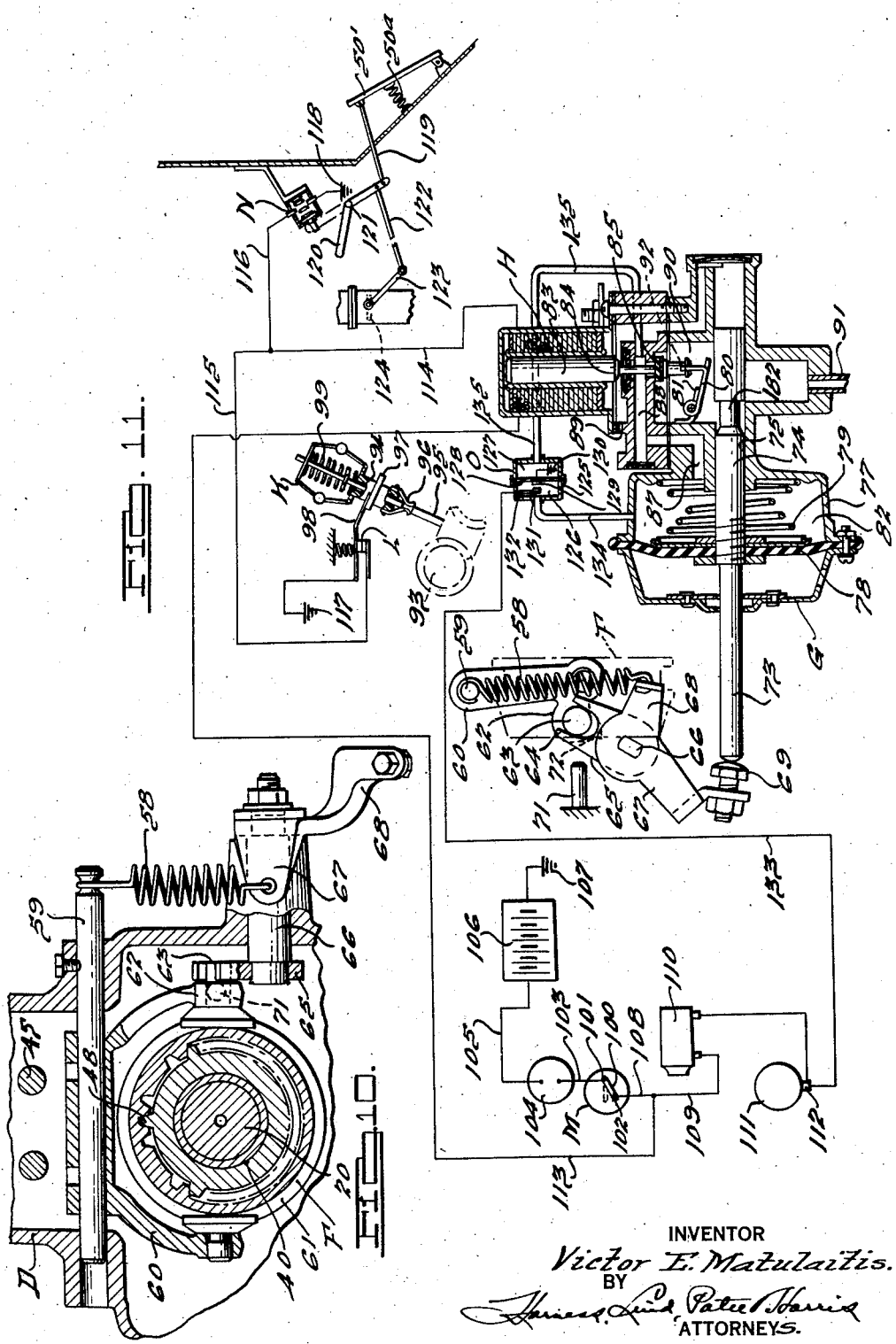

April 20, 1948.　　V. E. MATULAITIS　　2,440,055
POWER TRANSMISSION
Filed Nov. 14, 1940　　5 Sheets-Sheet 4

INVENTOR
Victor E. Matulaitis.
BY
ATTORNEYS

April 20, 1948. V. E. MATULAITIS 2,440,055
POWER TRANSMISSION
Filed Nov. 14, 1940 5 Sheets-Sheet 5

INVENTOR
Victor E. Matulaitis.
BY
ATTORNEYS.

Patented Apr. 20, 1948

2,440,055

UNITED STATES PATENT OFFICE 2,440,055

POWER TRANSMISSION

Victor E. Matulaitis, Highland Park, Mich., assignor to Chrysler Corporation, Highland Park, Mich., a corporation of Delaware Application November 14, 1940, Serial No. 365,591

27 Claims. (Cl. 74—472)

1

This invention relates to motor vehicles and refers more particularly to power transmission and control mechanism therefor.

My invention has particular reference to transmission systems in which the torque load is relieved as by momentary interruption of the engine ignition or by other suitable means in order to unload positively engageable drive control elements so as to facilitate disengagement of such elements. One example of such a transmission is described and claimed in the copending application of Carl A. Neracher et al., Serial No. 335,310, filed May 15, 1940.

In such transmission systems, the engine ignition when interrupted accommodates disengaging movement of the movable or shiftable drive control element but it sometimes happens that the interrupting mechanism functions to restore the ignition and hence the torque load at the drive control elements before disengagement thereof has been effected. This results in failure of the transmission to function properly. It is, of course, desirable to interrupt the ignition for as brief an interval of time as is necessary and because of many factors it is difficult to arrive at a time interval for setting the ignition interrupting mechanism so that it will function the same under all conditions. Among these factors are variation in oil viscosity, variation in clearance between the drive control elements and the fit of the parts in general, requirements for disengagement of the drive control elements incident to kick-down and bringing the car to a stop, and other factors all of which give rise to the aforesaid failure. Furthermore, it is not always so much the time of torque interruption that is of greatest importance in effecting the disengagement. Of greater significance in many instances is the effect of torque interruption itself because it is during the change in the condition of torque load that it is possible to disengage the movable drive control element. Thus, if the load is a drive load then the interruption either relieves this load sufficiently to allow movement of the movable element or is of such duration as to change the drive load to a coast load thereby also accommodating the disengagement during the interval of this change. If the initial load is a coast load then the same effect is obtained by either relieving this load or reversing it to a drive load during torque interruption. If the interruption occurs for an indefinitely long period of time and the movable element fails to disengage, prolongation of the time of interruption is of no avail because the torque load quickly reverses and it is as a

2 practical matter just as difficult to disengage the element under either drive or coast load.

Another difficulty experienced with transmission systems of the aforesaid character is in connection with failure of the ignition interrupting means to restore the ignition to normal operation after it has functioned to interrupt the ignition. This occurs especially in those transmissions employing interrupter switches which open and close by operative connection with some part movable with the shiftable drive control element. Thus, if such element fails to fully release then the ignition stays in its interrupted condition thereby rendering the engine inoperative as well as in failure of the transmission to function normally.

It is an object of my invention to overcome the aforesaid difficulties and failures by insuring disengagement of the movable drive control element under all desired conditions. This not only insures proper functioning of the ignition system and transmission mechanism but also provides for wider latitude in the allowable tolerances and clearances in the manufacture of the mechanism and controls therefor, and renders the device less sensitive to changes in temperature and resulting lubricant viscosity variation.

A further object of my invention is to provide improved and simplified means for controlling the torque-relieving or torque reversing means.

Another object is to provide an improved torque-relieving control which will automatically operate one or more times, according to the functioning of the movable drive control element, thereby insuring the desired movement of this element and preventing undue prolongation in the operation of the torque relief means.

An additional object is to provide a torque-relieving or torque-reversing control which will operate automatically for a period of time variably proportional to and in response to movement of the movable control element or some member moving as a function of this control element.

Another object is to provide a torque control which embodies a fluid pressure responsive device so as to automatically control torque variation as a function of pressure fluid variation. In systems which incorporate pressure fluid operation of the change speed control mechanism, I preferably arrange my pressure responsive device to operate as a function of variation in the pressure of the fluid medium in the transmission control mechanism.

Further objects and advantages of my invention reside in the novel combination and arrangement of parts more particularly hereinafter described and claimed, reference being had to the accompanying drawings in which:

Fig. 1 is a side elevational view showing the motor vehicle engine and power transmission.

Fig. 2 is a longitudinal sectional elevational view through the main clutching mechanism.

Fig. 3 is a similar view through the change speed transmission.

Fig. 4 is a detail enlarged view of the blocker clutch as seen in Fig. 3.

Fig. 5 is a sectional plan view illustrated as a development according to line 5—5 of Fig. 4, the automatic clutching sleeve being released.

Fig. 6 is a similar view showing the automatic clutching sleeve in its intermediate shift position during the drive blocking condition.

Fig. 7 is a similar view showing the automatic clutching sleeve in its coasting relationship for the Fig. 6 showing, the clutching sleeve being unblocked during coast for its clutching movement.

Fig. 8 is a similar view showing the automatic clutching sleeve in full clutching engagement.

Fig. 9 is a view similar to Fig. 5 but showing the automatic clutching sleeve in its other intermediate shift position during the coast blocking condition.

Fig. 10 is a sectional elevational view taken approximately as indicated by line 10—10 in Fig. 3 but showing only the upper portion of the transmission mechanism and particularly the lever operating mechanism for the automatic clutching sleeve when in its engaged position.

Fig. 11 is a diagrammatic view of the control mechanism for the automatic clutching sleeve, the latter being shown in its released position.

Figure 12:
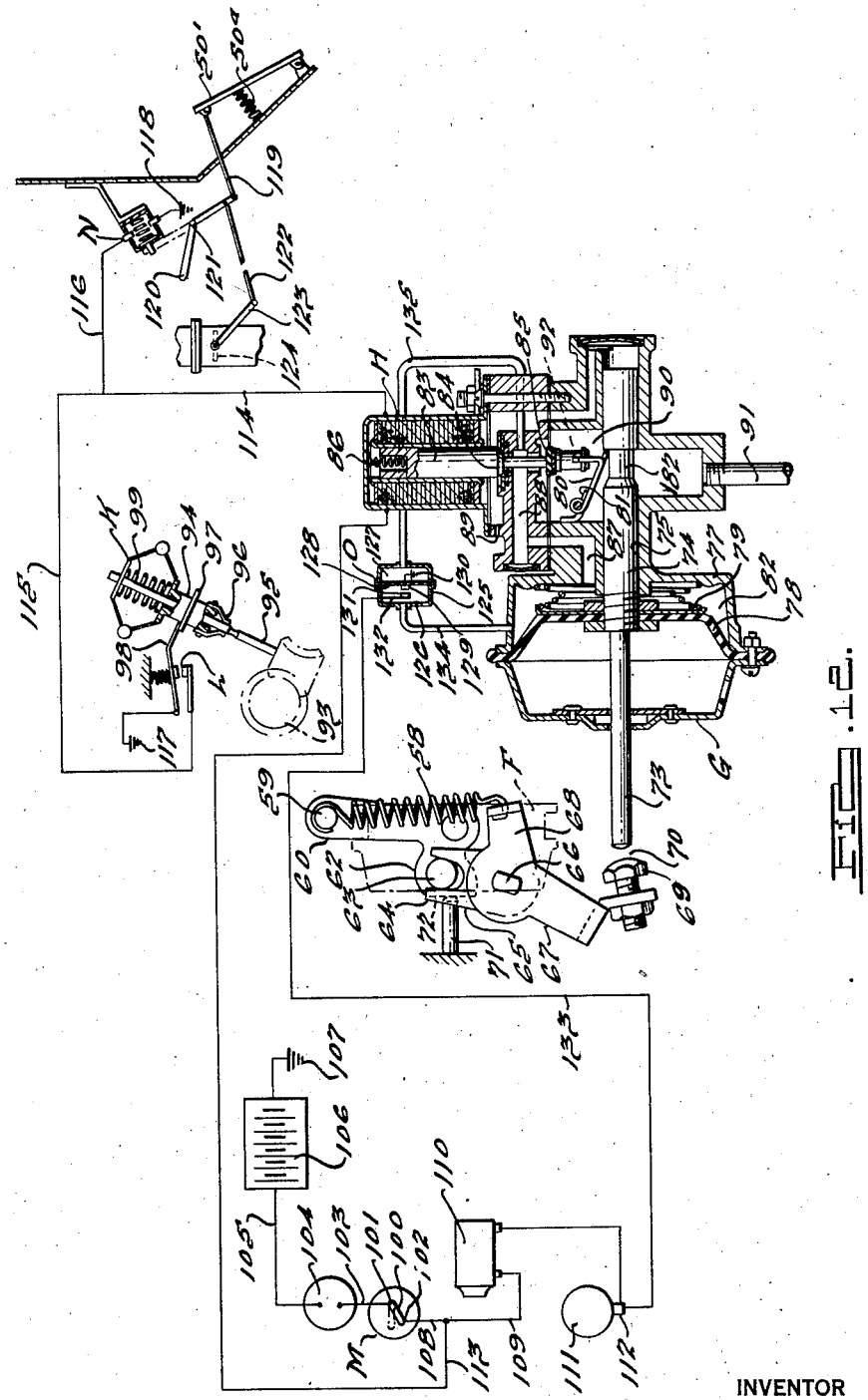
Fig. 12 is a similar view of the Fig. 11 mechanism corresponding to engaged position of the automatic clutching sleeve.

While my control may be employed in conjunction with various types and arrangements of motor vehicle transmissions, especially where a pair of relatively movable positively engageable drive control elements are employed, in order to illustrate one driving system I have shown my invention in connection with certain salient parts of the aforesaid Neracher et al. application.

In the drawings A represents the internal combustion engine which drives through fluid coupling B and conventional type of friction main clutch C to the speed ratio transmission D whence the drive passes from output shaft 20 to drive the rear vehicle wheels in the usual manner.

The engine crankshaft 21 carries the vaned fluid coupling impeller 22 which in the well known manner drives the vaned runner 23 whence the drive passes through hub 24 to clutch driving member 25. This member then transmits the drive, when clutch C is engaged as in Fig. 2, through driven member 26 to the transmission driving shaft 27 carrying the main drive pinion 28. A clutch pedal 29 controls clutch C such that when the driver depresses this pedal, collar 30 is thrust forward to cause levers 31 to release the clutch driving pressure plate 32 against springs 33 thereby releasing the drive between runner 23 and shaft 27. The primary function of the main clutch C is to enable the driver to make manual shifts in transmission D.

Referring to the transmission, pinion 28 is in constant mesh with gear 34 which drives countershaft 35 through an over-running clutch E of the usual type such that when shaft 27 drives in its usual clockwise direction (looking from front to rear) then clutch E will engage to lock gear 34 to countershaft 35 whenever the gear 34 tends to drive faster than the countershaft. However, whenever this gear 34 tends to rotate slower than the countershaft then clutch E will automatically release whereby shaft 27, under certain conditions, may readily drop its speed while countershaft 35 continues to revolve.

Countershaft 35 comprises cluster gears 36, 37 and 38 which respectively provide drives in first, third and reverse. Freely rotatable on shaft 20 are the first and third driven gears 39 and 40 respectively in constant mesh with countershaft gears 36 and 37. A hub 41 is splined on shaft 20 and carries therewith a manually shiftable sleeve 42 adapted to shift from the Fig. 3 neutral position either rearwardly to clutch with teeth 43 of gear 39 or else forwardly to clutch with teeth 44 of gear 40. Sleeve 42 is operably connected to shift rail 45 adapted for operation by any suitable means under shifting control of the vehicle driver.

Shaft 20 also carries reverse driven gear 46 fixed thereto. A reverse idler gear 47 is suitably mounted so that when reverse drive is desired, idler 47 is shifted into mesh with gears 38 and 46.

First, third and reverse speed ratio drives and neutral are under manual shift control of the vehicle driver, the main clutch C being released by depressing pedal 29 in shifting into any one of these drives.

First is obtained by shifting sleeve 42 to clutch with teeth 43, the drive passing from engine A, through fluid coupling B, clutch C and shaft 27 to pinion 28, thence through gear 34 and clutch E to countershaft 35. From the countershaft the drive is through gears 36, 39 and sleeve 42 to shaft 20.

Third is obtained by shifting sleeve 42 to clutch with teeth 44, the drive passing from the engine to the countershaft 35 as before, thence through gears 37, 40 and sleeve 42 to shaft 20.

Reverse is obtained by shifting idler 47 into mesh with gears 38, 46, sleeve 42 being in neutral, the reverse drive passing from the engine to the countershaft 35 as before, thence through gears 38, 47 and 46 to shaft 20.

Slidably splined on teeth 48 carried by gear 40 is the automatic clutching sleeve F which, under certain conditions, is adapted to shift forwardly to clutch with teeth 49 carried by pinion 28 thereby positively clutch shaft 27 directly to gear 40. This sleeve F is adapted to step-up the speed ratio drive from first to second and from third to fourth which is a direct drive speed ratio. Control means is provided which limits clutching of sleeve F to approximate synchronism with teeth 49 and also to a condition of engine coast, sleeve F being prevented from clutching during that condition known as engine drive as when the engine is being speeded up under power.

When driving in first, second is obtained by the driver releasing the usual accelerator pedal 50 thereby allowing spring 50ᵃ to close the engine throttle valve and cause the engine to rapidly coast down. When this occurs, the engine along with shaft 27, pinion 28 and gear 34 all slow down while shaft 20 along with gears 39 and 36 continue their speeds by accommodation of clutch E which now overruns. The engine slows down until teeth 49 are brought to approximate synchronism with sleeve F which thereupon automatically shifts to clutch with teeth 49 resulting in a two-way drive for second as follows: pinion 28 through sleeve F to gear 40 thence through gears 37, 36 and 39 to sleeve 42 and shaft 20, the clutch E overrunning.

When driving in third, fourth or direct is obtained just as for second by driver release of the accelerator pedal and resulting shift of sleeve F to clutch with teeth 49 when these parts are synchronized by reason of the engine coasting down from the drive in third. The direct drive is a two-way drive as follows: pinion 28 through sleeve F to gear 40 thence directly through sleeve 42 to shaft 20, clutch E overrunning as before.

Referring to Figs. 4 to 9 there is shown the blocking means for controlling clutching shift of sleeve F so as to limit clutching thereof to engine coasting and synchronous relationship of the clutching parts. Sleeve F is provided with a series of pairs of what may be termed long and short teeth 50, 51 certain of which may be bridged or joined together. A unitary blocker ring 52 is provided with blocking teeth 53 which either lie in the path of forward shift of teeth 50 or 51 or else between these teeth to allow clutching shift of sleeve F. Thus, blocker 52 has, at suitable locations, a drive lug 54 engaged in a slot 55 of gear 40. The blocker is urged under light energizing pressure of spring 56 into constant frictional engagement at 57 with pinion 28 so that the blocker tends to rotate with pinion 28 within the limits afforded by the travel of lug 54 circumferentially in slot 55.

During drive in first and third, the speed of shaft 27 exceeds the speed of gear 40 so that, if sleeve F is fully released, the parts will be positioned as in Fig. 5 wherein the blocker teeth 53 are in axial alignment with the short teeth 51. If now the sleeve F is urged forwardly it will move to the Fig. 6 position of drive blocking and will remain in this blocked position as long as the engine drives the car in first or third.

If now the driver releases the accelerator pedal so that the engine may coast down under accommodation of overrunning clutch E, while sleeve F is urged forwardly, then when pinion 28 is reduced in speed to that of sleeve F slight further drop in speed of pinion 28 for a fraction of a revolution below the speed of sleeve F will cause blocker 52 to rotate slightly relative to sleeve F until blocker teeth 53 strike the adjacent sides of long teeth 50 as in Fig. 7 thereby limiting further reduction in speed of the blocker relative to sleeve F. At this time the sleeve F is free to complete its forward clutching shift with teeth 49, as in Fig. 8, the blocker teeth 53 passing between adjacent long and short teeth 50, 51. With the sleeve F thus clutched during engine coast, a two-way drive is established in second or fourth depending on whether the manually shiftable sleeve F was set for first or third just prior to the clutching shift of sleeve F.

In the event that sleeve F is urged forwardly from its Fig. 6 position at a time when the gear 40 is rotating faster than pinion 28, then the blocker 52 will lag behind the sleeve and will be blocked by engagement of long teeth 50 with the blocker teeth 53 as shown in Fig. 9. This is referred to as the coast blocking condition. If now the engine is speeded up by the driver depressing the accelerator pedal in the usual manner, then the engine and blocker 52 rotate forwardly and blocker teeth 53 move over to the Fig. 6 drive blocking position thereby jumping the gap between teeth 50 and 51. This is the primary reason for providing the long and short teeth whereby sleeve F clutches only from the drive blocking condition followed by engine coast which protects the teeth and avoids harsh clutching effects on the passengers and transmission mechanism. On accelerating the engine from the Fig. 9 coast blocking condition, the engine comes up to a speed limited by engagement of the overrunning clutch E for drive in either first or third depending on the setting of the manual shiftable sleeve 42. Then on releasing the accelerator pedal the sleeve F will synchronously clutch with teeth 49 during coast to step-up the drive to either second or fourth as aforesaid.

The transmission is provided with suitable motor means for controlling shift of sleeve F along with several control means. Referring particularly to Figs. 11 and 12, there is illustrated a pressure fluid operated motor G utilizing air pressure for its operation. For convenience this motor is arranged to operate by the "vacuum" in the intake manifold system of the engine under control of electromagnetic means illustrated in the form of a solenoid H. The term "vacuum" is commonly used to denote pressures less than atmospheric and it is in this sense that I use this term and not in the strict sense of zero pressure or absolute vacuum.

Forward shift of sleeve F is effected, under control of motor G, by reason of a spring 58 having its upper end fixed by engaging the outboard portion of a transverse shaft 59 fixed in the housing of transmission D. Mounted to freely rock on shaft 59 is a shift yoke 60 which engages the shift groove 61 of sleeve F, this yoke having one of its arms provided with a forwardly extending lever 62 carrying a lateral pin 63 which engages the yoke portion 64 of an upstanding lever 65. This lever 65 is fixed to the inboard end of a rockshaft 66 the outboard end of which has fixed thereto a bell-crank follower lever member having lever arms 67 and 68. The end of lever 68 is connected to the lower end of spring 58 and lever 67 carries an adjustable abutment 69 for adjusting the lost-motion at gap 70 (Fig. 12) as will presently be apparent.

Spring 58 acts to yieldingly urge engagement of sleeve F, acting through lever 68, shaft 66 and lever 65, to cause pin 63 to swing yoke 60 forwardly on its shaft 59 until, when sleeve F is fully engaged, a stop pin 71 engages the forward flat face 72 of lever 62. This limits rearward swing of lever 67.

Arranged for engaging the abutment 69 during its arcuate movement about the axis of shaft 66, is a thrust-imparting leader member in the form of a reciprocatory rod 73 having an enlarged central portion 74 slidably supported in the bore 75 of motor G.

Motor G comprises a cylinder 77 which contains a differential fluid pressure operated element or member 78, herein illustrated as the diaphragm type. This member has its outer portion secured to cylinder 77 and its central portion fixed to the rod 73, the member and rod being urged forwardly in a direction to release sleeve F by a spring 79 which is much stronger than spring 58. A suitable type of releasable holding means is provided for rod 73 so as to releasably hold this rod and member 78 rearwardly retracted to their Fig. 12 positions against the action of spring 79 until it is desired to urge disengagement of sleeve F. This releasable holding means is illustrated in the form of a latch 80 which, under the action of a rat-trap spring 81, catches on the rearward shoulder of a detent 182 in rod portion 74 as in Fig. 12. At this time leader rod 73 moves rearwardly further than follower lever 67 by the amount of the aforesaid gap 70 such that on releasing latch 80 the rod 73 may move forwardly the amount of this gap without requiring sleeve F to move from its engaged position toward its disengaged position.

The vacuum supply to the working chamber 82 is under control of the aforesaid solenoid H which comprises an armature plunger 83 having valving parts 84, 85. In Fig. 11 the solenoid H is energized thereby raising plunger 83 against spring 86 to seat valve 85 and shut off the vacuum supply to chamber 82 and at the same time unseat valve 84 so as to vent this chamber through passage 87, chamber 88 and vent passage 89. When the solenoid is de-energized then spring 86 lowers plunger 83 thereby seating valve 84 to shut off vent 89 and open valve 85 as in Fig. 12 thereby opening chamber 82 to the engine intake manifold J through passage 87, chamber 88, chamber 90 and pipe 91.

A certain lost motion is provided between plunger 83 and the inwardly bent finger 92 of latch 80 so that when the plunger moves downwardly the latch may subsequently catch at detent 182 when vacuum operates member 78, the parts then remaining in the Fig. 12 position independently of vacuum in chamber 82 until solenoid H is energized to release the latch and vent chamber 82.

It is deemed preferable to provide a speed control on the energization of solenoid H so as to insure automatic release of sleeve F below a predetermined car speed and to accommodate automatic engagement of sleeve F above a predetermined car speed. Whenever the car is in forward driving condition the manual sleeve 42 is either shifted rearwardly to the low range or forwardly to the high range so that by driving a governor from the countershaft 35 it is possible to provide a speed control operated proportionate to the speed of travel of the car. Driven from countershaft gear 93 is a governor K of any suitable type, this governor operating a sleeve 94 outwardly along its drive shaft 95 as the car speed reaches a predetermined point, the breakaway being under control of a detent 96 if desired.

The sleeve 94 has a shoulder 97 engaged by the swinging switch piece 98 of the governor switch L. When the car is stationary the detent 96 is engaged and switch L is closed. As the car accelerates the governor eventually reaches its critical speed and detent 96 releases thereby causing switch L to open. As the car slows down, the governor spring 99 restores the parts to the Fig. 11 position and by proportioning the various parts it is obvious that switch L may be made to function at desired speeds proportionate to car travel. As an example of one arrangement of governor operation and gearing arrangement, the governor may be made to open switch L during car acceleration in first and third respectively at approximately 7 and 15 M. P. H. (miles per hour), the switch L closing on stopping the car in direct and second at approximately 7 and 3 M. P. H. respectively.

The driver operated ignition switch is designated at M and comprises a conductor 100 which, in the Fig. 11 position showing the switch "on" or closed, electrically connects contacts 101 and 102. Contact 101 extends by conductor 103 to ammeter 104 and thence by conductor 105 to the usual storage battery 106 and thence to ground 107. Contact 102 has a conductor 108 extending by conductor 109 branching therefrom to the engine ignition system herein shown in part as comprising coil 110 and the distributer 111 having the primary terminal 112.

A second conductor 113 branches from conductor 108 to the solenoid H and thence by conductor 114 to two conductors 115 and 116, the former extending to governor switch L and thence to ground 117. Conductor 116 extends to kickdown switch N and thence to ground 118. The switch N is normally open and is closed preferably by a full depression of accelerator pedal 50' acting through link 119 and a bell-crank lever 120 pivotally mounted at 121. Lever 120 actuates a link 122 which extends forwardly to adjust the engine throttle valve lever 123. When pedal 50' is thus depressed, the lever 123 is positioned to fully open the throttle valve 124 and as the throttle valve is adjusted in its wide-open range the lever 120 closes switch N to effect a step-down in the transmission from fourth to third or from second to first by energizing the solenoid H.

The governor solenoid circuit is as follows: ground 107 to battery 106 thence by conductor 105 to ammeter 104 and by conductor 103 to ignition switch M. From switch M this circuit extends through conductors 108 and 113 to solenoid H and thence by conductors 114 and 115 to switch L and ground 117.

The kickdown solenoid circuit is the same as the governor solenoid circuit to conductor 114 whence this circuit extends by conductor 116 to kickdown switch N and ground 118.

The engine ignition circuit is the same as the governor solenoid circuit up to the conductor 108 whence this circuit extends by conductor 109 to coil 110 and distributer 111.

In carrying out my invention I provide means which functions to relieve the thrust-application between the teeth of sleeve F and the teeth 49 thereby facilitating movement of the drive-control sleeve element F from its Fig. 12 position of engaging relationship into its Fig. 11 position of disengaging relationship with respect to teeth 49. This relief means is arranged to function automatically proportional to disengaging movement of sleeve F and to forward travel of rod 73 from a first position as in Fig. 12 to a second position of taking up gap 70 and to a third position as in Fig. 11 where it is in the forwardmost limit of its travel corresponding to full disengaging travel of sleeve F. Thus this relief means will be operated one or more times and for varying lengths of time depending on the manner in which sleeve F moves and the time of operation of the relief means will vary accordingly.

In the present instance the relief means is in the form of a system of grounding the primary terminal 112 of the usual distributer 111 of the engine ignition system whereby the engine ignition may be momentarily rendered inoperative thereby unloading the torque at sleeve F for one or more successive cycles sufficient to insure its release by spring 79. This ignition interrupting system is under control of a pressure fluid operating device.

Where the transmission system, as in Fig. 11, employs a pressure fluid operator as at G, I preferably utilize the pressure varying characteristics in chamber 82 for controlling the relief means.

In Fig. 11 I provide what may be termed a pressure fluid or vacuum switch O comprising a cylinder 125 divided into two chambers 126, 127 by a resilient diaphragm 128 so arranged as to normally take a position as in Fig. 11. This diaphragm 128 carries a switch contact 129 in chamber 126 and is suitably grounded as indicated at 130. A second fixed switch contact 131 is disposed in chamber 126 for engagement by contact 129 when diaphragm 128 is flexed forwardly. Contact 131 is carried by a conductor 132 which extends by conductor 133 to the aforesaid terminal 112 of distributer 111. The switch O thus provides an ignition interrupting switch and controls grounding of the ignition system. When switch O is closed, by contact 129 engaging contact 131, an ignition grounding circuit is established from distributer terminal 133 through conductor 132, contacts 131 and 129 to the ground 130.

The cylinder 125 is much smaller than cylinder 77 and chamber 126 is in constant communication with chamber 82 by a pipe 134. Chamber 127 is placed in communication by a pipe 135 with any convenient part of the common vacuum and vent passage system between chamber 82 and valves 84, 85 although for the best results the pipe 135 should be disposed to communicate with the common vacuum and vent system as remotely from chamber 82 as convenient inasmuch as diaphragm 128 is to move by reason of pressure difference in the vacuum and vent system.

When the latch 80 is released with the parts positioned as in Fig. 12, sleeve F being clutched, spring 79 operates to rapidly close the gap 70 at the lost-motion between rod 73 and lever 67 thereby establishing thrust-transmitting relationship between spring 79 and follower lever 67 for acting through lever 64 and yoke 60 to urge sleeve F rearwardly into its Fig. 4 position of disengagement with respect to the pinion teeth 49.

In order to illustrate the principles of my invention let it be assumed that latch 80 is released as aforesaid during the kickdown operation, by closing switch N, such that the engine is operating under open throttle conditions whereby the engine torque is acting to cause pinion teeth 49 to transmit its drive at the sides of the short teeth 51 of sleeve F.

Under the foregoing circumstances, just prior to release of latch 80, the parts are positioned as in Fig. 12 and switch O is open because chambers 126 and 127 are under the same conditions or degree of vacuum thereby allowing diaphragm 128 to assume its Fig. 12 position. When latch 80 is released by upward movement of solenoid plunger 83, chamber 82 is then opened to vent 89 and spring 79 rapidly moves member 78 forwardly to take up the gap 70. As the volume of chamber 126 is so much less than the volume of chamber 82, and as the pipe 135 communicates with the vent system closer to the valve 84 than the pipe 134, the forward movement of diaphragm 78 in taking up gap 70 tends to cause a lag in the buildup of atmospheric pressure in chamber 82 and hence in chamber 126 whereas atmospheric pressure builds up more rapidly in chamber 127. Therefore, in effect, this movement of diaphragm 78 may be said to maintain at least a certain amount of the previously existing vacuum in chambers 82 and 126 for a longer time than would be the case if, for example, the diaphragm did not move after solenoid plunger 82 moved upwardly from its Fig. 12 position. This causes diaphragm 128 to flex forwardly to close switch O and establish the ignition grounding circuit.

There is also a certain amount of restriction, which may be varied as desired, between valve 84 and chamber 82 and this also produces a lag in the pressure rise in chambers 82 and 126 in comparison with the pressure rise in chambers 88 and 127 when the plunger 83 is raised from its Fig. 12 position to its Fig. 11 position.

When switch O closes as aforesaid, the engine tends to slow down sufficiently to unload the thrust-application at sleeve F and rod 73 ordinarily completes its stroke to the Fig. 11 position of releasing sleeve F. Thereupon rod 73 stops and the atmospheric pressure immediately becomes established in chambers 126 and 127 to allow diaphragm 128 to be restored to open the switch O which has been closed for a time period equal to that taken up by movement of rod 73 from approximately its Fig. 12 position of closing switch O to its Fig. 11 position of opening switch O. The foregoing cycle of momentary interruption will occur provided that the sleeve F will slide freely, and provided that the various linkage parts do not tend to bind as may happen in very cold weather, and provided that the member 78 keeps moving fast enough to maintain a lower pressure in chamber 126 than in chamber 127. If the rod 73 is not sufficiently moved during the latter part of its forward stroke to maintain switch O closed during this stroke portion, then the switch O automatically opens and the ignition is restored and the engine tends to speed up. This characteristic is advantageous and is utilized to provide a number of cycles of momentary interruption of the ignition for progressively disengaging the sleeve in stages of movement, especially when the parts are sluggish in action or tend to bind. As an example let it be assumed that for some reason the sleeve F does not immediately release when rod 73 thrusts against lever 67, the switch O being closed as before, so that the sleeve tends to stick part way released. When this occurs the member 78 will slow up or stop to allow switch O to automatically open by establishing a pressure balance on diaphragm 128. Now as it takes only a fraction of a second for the drive load at the teeth of sleeve F to change to a coast load after switch O closes, by the time switch O opens, under said circumstances, the engine tends to speed up and reverse the tooth load from coast to drive or else to only relieve the coast load if the sleeve disengages before torque reversal can take place. This in turn allows rod 73 to again move sleeve F rearwardly thereby creating a sudden pressure drop in chamber 126 relative to chamber 127 so as to cause diaphragm 128 to close switch O and if rod 73 should again slow up or stop under the relieved drive load or the then coast load, then switch O opens again and the cycle of torque relief or torque reversal is repeated for any number of times automatically, the time of ignition interruption being of course responsive to and determined by movement of the rod 73 and sleeve F. If sleeve F should for any reason so jam that only gap 70 is taken up when latch 80 is released, then the ignition interruption is not unduly prolonged as immediate pressure balance then takes place at diaphragm 128 and opens switch O and the car can be driven in second or fourth although this is, of course, an unusual condition. Ordinarily even with the occurrence of several cycles of momentary ignition interruption the disengagement of sleeve F occurs so rapidly as to be unnoticed on the part of the driver.

In the event that latch 80 is raised to start rod 73 forwardly at a time when sleeve F is driving teeth 49, as in bringing the car to rest, then the switch J, may likewise function to provide one or a plurality of torque relief and restoring cycles just as previously set forth in connection with kickdown except, of course, than unless this occurs below or approximately at the idling speed of the engine there will not result any tendency to change the direction of imposed torque at teeth 49. Such arrangement may be provided although it is not altogether necessary as, in bringing the car to rest, the spring 79 is ordinarily of such strength as to cause release of the sleeve F as the coast torque load becomes relatively small at this time.

In the operation of the mechanism, the car at standstill and with the ignition switch M closed and the engine idling will cause the solenoid H to be energized as in Fig. 11 because governor switch K is closed thereby establishing the governor solenoid circuit. Chamber 82 is vented and sleeve F disengaged. The driver shifts sleeve 42 to either the high or low range and accelerates the car ordinarily above the critical speed of governor K thereby causing switch L to open to break the governor solenoid circuit. As vacuum builds up in the engine intake manifold J, plunger 83 now being lowered by spring 86 because switch L is open, member 78 will be operated by vacuum thereby moving rod 73 to its Fig. 12 latched position. As soon as the driver allows the engine to coast, sleeve F will engage teeth 49 synchronously to step-up the drive to either second or fourth although the step-up will be delayed by the blocker 52 until engine coast thereby enabling drive in the slower driving ratio of first or third as long as desired.

If the car is initially accelerated in first above the governor critical speed and the engine allowed to coast, then second will automatically become operative. Then if the driver shifts sleeve 42 forwardly to the high range, third will of course be skipped and fourth will be obtained because sleeve F will remain engaged. Ordinarily, especially where the car is equipped with a fluid coupling B, the sleeve 42 may be left in its high range and all starts and stops made without further shifting. This is possible owing to slippage in the fluid coupling when stopping the car for a traffic light and is practicable because the fluid coupling allows high engine torque for favorable car acceleration and because governor K directs a downshift on bringing the car to rest. Thus there is automatically provided a favorable torque-multiplying gearing for starting, as in third.

Whenever the car is driving in fourth or second above the governor critical speed, a full depression of the accelerator pedal will cause the transmission to step-down to third or first, the transmission step-up back to fourth or second taking place on release of the accelerator pedal with attendant synchronization of sleeve F with teeth 49.

When the accelerator pedal is fully depressed for the kickdown, switch N closes thereby energizing the kickdown solenoid circuit and causing solenoid H to raise plunger 83 and release latch 80 thereby venting chamber 82. At this time the sleeve F is under driving torque from the engine operating under wide-open throttle. However, when latch 80 is released, spring 79 operates rod 73 forwardly under accommodation of gap 70 to start the single or plurality of cycles of momentary ignition interruption by switch O thus insuring release of sleeve F whereupon the ignition is finally restored by switch O and the engine quickly speeds up to engage overrunning clutch E for establishing the third or first driving ratio depending on the setting of sleeve 42 prior to the kickdown operation.

It is not altogether necessary to provide for free movement of member 78 relative to movement of sleeve F, as afforded by the lost motion at gap 70, when latch 80 is released from the Fig. 12 position of the parts. Even without the gap 70 it will be apparent that when plunger 83 is raised to open valve 84, the pressure in chamber 127 will rise toward atmospheric pressure faster than the pressure rise in chamber 126 because of the large capacity of chamber 82 and because pipe 135 communicates with the venting passages in close proximity to valve 84. Such pressure differential causes diaphragm 128 to flex forwardly to bring contact 129 into engagement with contact 131 thereby grounding the ignition system. If desired the venting passage from valve 84 to chamber 82 may be made with more restrictions than illustrated, to increase the time differential between pressure build-up in chambers 127 and 126 under the above conditions.

It will be apparent that under ordinary driving conditions when plunger 83 is either up or down, switch O will remain open so that the engine ignition will operate normally because the pressure in chambers 126 and 127 will be equal whether these chambers are subjected to atmospheric pressure or to vacuum.

Figure 13:
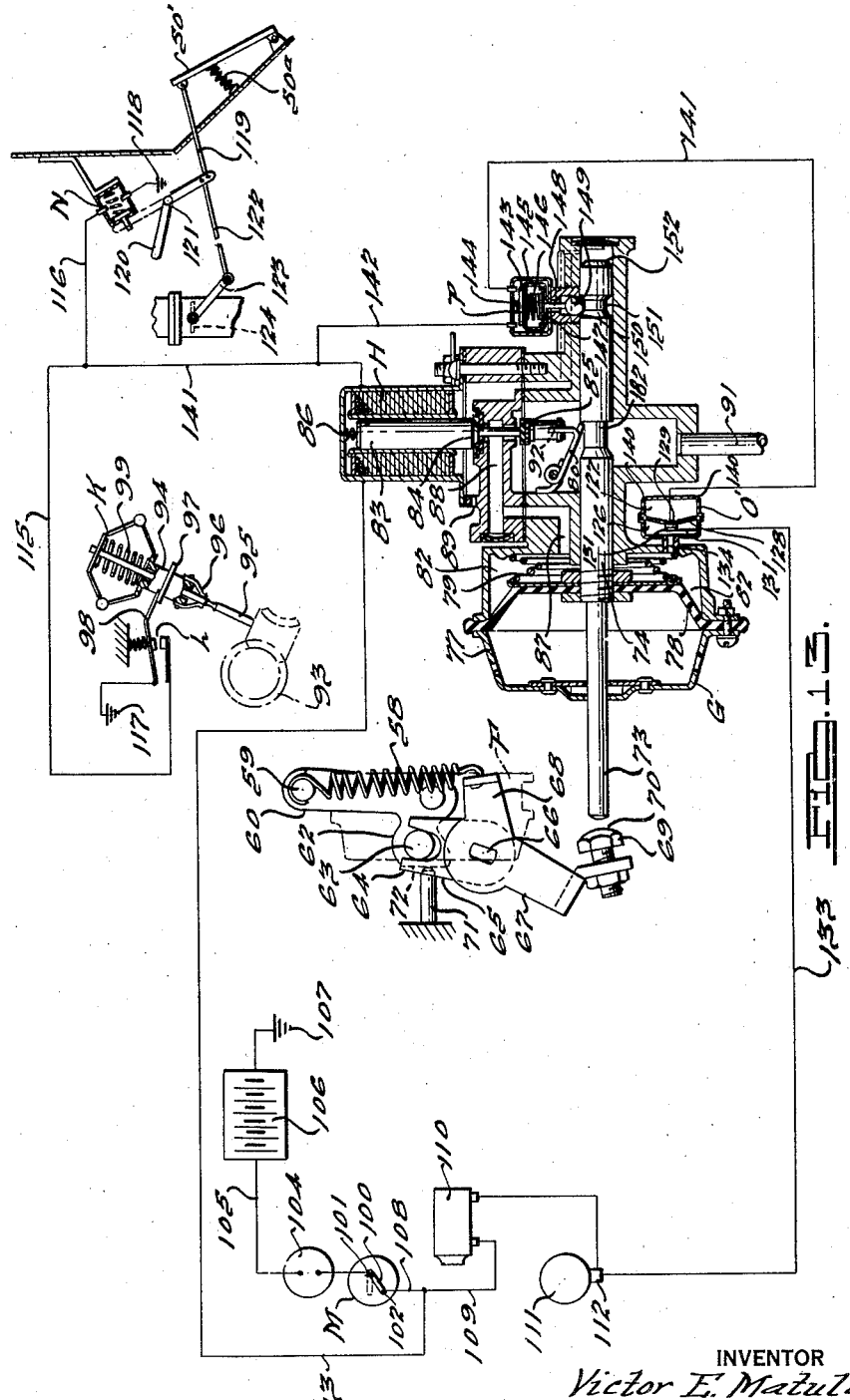
Fig. 13 is a view generally similar to Fig. 12 but showing a modified form of my invention.

Referring now to the modified arrangement in Fig. 13, the general transmission system is identical with that in Fig. 12.

In Fig. 13 the vacuum switch O' has its same chamber 126 open to chamber 82 so that vacuum therein will cause the diaphragm 128 to flex forwardly and move its contact 129 in engagement with contact 131 to close the switch; contact 131 leading to the distributer 111 as in Fig. 12. However, chamber 127 is now vented directly to the atmosphere at 140 and contact 129 extends electrically by conductor 141 to one terminal of a second interrupter switch P in series with switch O'. The other terminal of switch P extends by conductor 142 to a suitable ground, preferably to conductor 141 so that it will ground either at 117 through the governor switch L or else at 118 through the kickdown switch N.

Switch P comprises a bridging conductor switch piece 143 normally held away from the switch terminals by a spring 144. Switch piece 143 is carried by a cup 145 containing a spring 146 of greater force than spring 144 and acting to seat a slide plate 147 in the bottom of cup 145. Plate 147 carries a plunger 148 acting on a ball 149 which is prevented from falling inwardly out of its ball guide by peening the guide end at 150.

Leader rod 73 now has its rear end somewhat more extended than in Fig. 12 to provide a pair of detents 151, 152 for the ball 149. Whenever rod 73 is positioned as in Fig. 13 or fully forwardly corresponding to the Fig. 11 position, ball 149 is lowered by spring 144 acting through cup 145, spring 146, plate 147 and plunger 148 so that switch P is open. However, when rod 73 moves forwardly in taking up gap 70 and when this rod moves further forwardly for disengaging travel of sleeve F, switch P is closed by reason of ball 149 being urged upwardly by the rod portion between detents 151 and 152, any excess of upward ball movement over that necessary to engage switch piece 143 with the switch terminals being accommodated by spring 146 which otherwise holds plate 147 at the bottom of cup 145.

The ignition grounding circuit now extends from the distributer primary terminal 112 through conductor 133 and switch O' to conductor 141 and switch P thence by conductors 142 and 141 to either switch L and ground 117 or else to switch N and ground 118.

In Fig. 13 the switch O' is not directly grounded because during normal car running when sleeve F is clutched, as in Fig. 13, the vacuum in chambers 82 and 126 causes switch O' to be maintained closed. At this time the ignition system must be maintained operative and this is accomplished by the introduction of switch P which is open at this time. It is furthermore desirable to ground the ignition system through an interrupter switch P before grounding at 117 or 118 in order to prevent shorting the primary ignition coil as would otherwise occur from coil 110 to distributer 111 thence to conductor 133, switch O' and conductors 141, 142 (considering switch P omitted) thence through solenoid H back to coil 110. Such shorting is normally prevented by the switch P.

In the operation of the Fig. 13 mechanism when latch 80 is retracted from its Fig. 13 position as by closing kickdown switch N, rod 73 moves forwardly as before to take up gap 70. As soon as rod 73 moves forwardly the switch P is closed and although valve 85 is seated and valve 84 unseated for venting chamber 82, the forward movement of member 78 maintains the pressure in chamber 82 sufficiently below atmospheric pressure to cause diaphragm 128 to close switch O' assisted also by the relatively restricted passages 87, 88. With switches O' and P both closed the ignition interrupting circuit is established and rod 73 continues its forward movement releasing sleeve F whereupon rod 73 stops, to allow the pressure to build up in chamber 126 so that switch O' opens, and also to cause switch P to open at detent 152.

If for any reason the rod 73 should stop or move so slowly after taking up gap 70 that switch O' should open, with the sleeve F still partially engaged, then, even though switch P is closed, the ignition will be automatically established accompanied by engine drive instead of coast thereby facilitating further rearward movement of sleeve F and further forward movement of member 78 to cause switch O' to close and bring about another or further cycles of momentary ignition interruption until sleeve F is finally released accompanied by opening of switches O' and P. Just as for Fig. 12 the time that switch O' remains closed, while switch P is closed, will depend on rate of movement of rod 73 and sleeve F. The ignition will thus be interrupted automatically just as often and for a period of time automatically correlated to the requirements for effecting disengagement of sleeve F. Furthermore, should the sleeve F stick in its partly or even fully engaged position, then even though switch P is closed, the switch O' will remain open and the engine will operate normally to drive the car and as soon as the switch L is closed the member 78 will be vacuum moved to its latched position thereby restoring switch P to its open position.

By reason of the ground wire of the ignition interrupting circuit being under control of governor switch L and kickdown switch N, it will be apparent that the ignition will not be interrupted unless one of the switches L or N is closed and as interruption is not desired at any other time this arrangement also affords a further protective control on the interrupting means in addition to the aforesaid benefits arising from the Fig. 13 system.

Apart from the differences arising from the Fig. 13 interrupting system, the Fig. 13 mechanism operates just as described for the main embodiment in Figs. 1 to 12 and will not therefore be repeated.

I claim:

1. In a drive for a motor vehicle having an engine; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; an ignition system for said engine adapted to be interrupted to relieve said thrust-application; pressure fluid operating means adapted for pressure fluid operation to control movement of said movable element into one of its said relationships and to be vented to control movement of said movable element into the other of its said relationships; and means responsive to pressure fluid variation at said pressure fluid operating means for effecting interruption of said ignition system.

2. In a drive for a motor vehicle having an engine; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; means operable to cause relief of said thrust-application; pressure fluid operating means adapted for pressure fluid operation to control movement of said movable element into one of its said relationships and to be vented to control movement of said movable element into the other of its said relationships; and means operably responsive to pressure fluid variation at said pressure fluid operating means for controlling operation of said relief means.

3. In a drive for a motor vehicle having an engine provided with an intake system; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; an ignition system for said engine adapted to be interrupted to relieve said thrust-application; vacuum operating means adapted for vacuum operation to control movement of said movable element into one of its said relationships and to be vented to control movement of said movable element into the other of its said relationships;

said vacuum operating means including a member adapted for vacuum operation; means extending between said member and said intake system for subjecting said member to vacuum in said intake system to effect said vacuum operation of said member; means for venting said vacuum-subjecting-means; and means responsive to pressure change in said vacuum-subjecting-means for effecting interruption of said ignition system.

4. In a drive for a motor vehicle having an engine; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; means operable to cause relief of said thrust-application; vacuum operating means adapted for vacuum operation to control movement of said movable element into one of its said relationships and to be vented to control movement of said movable element into the other of its said relationships; said vacuum operating means including a member adapted for vacuum operation; means extending between said member and said intake system for subjecting said member to vacuum in said intake system to effect said vacuum operation of said member; means for venting said vacuum-subjecting-means; and means responsive to pressure change in said vacuum-subjecting-means, when vented, for effecting operation of said relief means.

5. In a drive for a motor vehicle having an engine provided with an intake system; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; an ignition system for said engine adapted to be interrupted to relieve said thrust-application; vacuum operating means adapted for vacuum operation to control movement of said movable element into one of its said relationships and to be vented to control movement of said movable element into the other of its said relationships; said vacuum operating means including a member adapted for vacuum operation; means extending between said member and said intake system for subjecting said member to vacuum in said intake system to effect said vacuum operation of said member; means for venting said vacuum-subjecting-means; and differential pressure means operable in response to pressure difference in said vacuum-subjecting-means for effecting interruption of said ignition system.

6. In a drive for a motor vehicle having an engine; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; means operable to cause relief of said thrust-application; vacuum operating means adapted for vacuum operation to control movement of said movable element into one of its said relationships and to be vented to control movement of said movable element into the other of its said relationships; said vacuum operating means including a member adapted for vacuum operation; means extending between said member and said intake system for subjecting said member to vacuum in said intake system to effect said vacuum operation of said member; means for venting said vacuum-subjecting-means; and differential pressure means operable in response to pressure difference between a plurality of points in said vacuum-subjecting-means for controlling operation of said relief means.

7. In a drive for a motor vehicle having an engine; a variable speed ratio transmission comprising means operable to effect change in the speed ratio drive between the engine and vehicle; an ignition system for said engine adapted to be interrupted to facilitate operation of said speed ratio change means; change speed control means operable to control operation of said speed ratio change means, comprising, a chamber having a member movably associated therewith such that movement of said member causes a lag in pressure build up in said chamber; and means operable as a result of such lag in pressure build-up for effecting interruption of said ignition system.

8. In a drive for a motor vehicle having an engine; a variable speed ratio transmission comprising means operable to effect change in the speed ratio drive between the engine and vehicle; means operable to cause momentary torque reversal in said transmission; change speed control means operable to control operation of said speed ratio change means, comprising, a chamber having a member movably associated therewith such that movement of said member causes a lag in pressure build up in said chamber; and means operable as a result of such lag in pressure build up for controlling operation of said torque reversal means.

9. In a drive for a motor vehicle having an engine provided with an intake system; a variable speed ratio transmission comprising means operable to effect change in the speed ratio drive between the engine and vehicle; an ignition system for said engine adapted to be interrupted to facilitate operation of said speed ratio change means; vacuum operating means for controlling operation of said speed ratio change means, comprising, a member, and means extending between said member and said intake system for subjecting said member to vacuum in said intake system; means for venting said vacuum-subjecting-means; and means responsive to pressure change in said vacuum-subjecting-means for effecting interruption of said ignition system.

10. In a drive for a motor vehicle having an engine provided with an intake system; a variable speed ratio transmission comprising means operable to effect change in the speed ratio drive between the engine and vehicle; means operable to cause momentary torque reversal in said transmission; vacuum operating means for controlling operation of said speed ratio change means, comprising, a member, and means extending between said member and said intake system for subjecting said member to vacuum in said intake system; means for venting said vacuum-subjecting-means; and means responsive to pressure change in said vacuum-subjecting-means, when vented, for controlling operation of said torque reversal means.

11. In a drive for a motor vehicle having an engine provided with an intake system; a variable speed ratio transmission comprising means operable to effect change in the speed ratio drive between the engine and vehicle; an ignition system for said engine adapted to be interrupted to facilitate operation of said speed ratio change means; vacuum operating means for controlling operation of said speed ratio change means, comprising, a member, and means extending between said member and said intake system for subjecting said member to vacuum in said intake system; means for venting said vacuum-subjecting-means; and differential pressure means operable in response to pressure difference in said vacuum-subjecting-means for effecting interruption of said ignition system.

12. In a drive for a motor vehicle having an engine provided with an intake system; a variable speed ratio transmission comprising means operable to effect change in the speed ratio drive between the engine and vehicle; means operable to cause momentary torque reversal in said transmission; vacuum operating means for controlling operation of said speed ratio change means, comprising, a member, and means extending between said member and said intake system for subjecting said member to vacuum in said intake system; means for venting said vacuum-subjecting-means; and differential pressure means operable in response to pressure difference between a plurality of points in said vacuum-subjecting-means, when vented, for controlling operation of said relief means.

13. In a drive for a motor vehicle having a throttle controlled intake system; means operable under control of the vehicle driver for effecting opening and closing movements of said throttle; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; an ignition system for said engine adapted to be interrupted to relieve said thrust-application; vacuum operating means adapted for vacuum operation to control movement of said movable element into one of its said relationships and to be vented to control movement of said movable element into the other of its said relationships; said vacuum operating means including a member adapted for vacuum operation; means extending between said member and said intake system for subjecting said member to vacuum in said intake system to effect said vacuum operation of said member; means operable in response to driver operation of said throttle-moving-means for venting said vacuum-subjecting-means; and means responsive to pressure change in said vacuum-subjecting-means for effecting interruption of said ignition system.

14. In a drive for a motor vehicle having a throttle controlled intake system; means operable under control of the vehicle driver for effecting opening and closing movements of said throttle; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; means operable to cause relief of said thrust transmission; vacuum operating means adapted for vacuum operation to control movement of said movable element into one of its said relationships and to be vented to control movement of said movable element into the other of its said relationships; said vacuum operating means including a member adapted for vacuum operation; means extending between said member and said intake system for subjecting said member to vacuum in said intake system to effect said vacuum operation of said member; means operable in response to driver operation of said throttle-moving-means for venting said vacuum-subjecting-means; and means responsive to pressure change in said vacuum-subjecting-means for controlling operation of said relief means.

15. In a drive for a motor vehicle having a throttle controlled intake system; means operable under control of the vehicle driver for effecting opening and closing movements of said throttle; a variable speed ratio transmission comprising means operable to effect change in the speed ratio drive between the engine and vehicle; an ignition system for said engine adapted to be interrupted to facilitate operation of said speed ratio change means; vacuum operating means for controlling operation of said speed ratio change means, comprising, a member, and means extending between said member and said intake system for subjecting said member to vacuum in said intake system; means operable in response to driver operation of said throttle-moving-means for venting said vacuum-subjecting-means; and means responsive to pressure change in said vacuum-subjecting-means for effecting interruption of said ignition system.

16. In a drive for a motor vehicle having a throttle controlled intake system; means operable under control of the vehicle driver for effecting opening and closing movements of said throttle; a variable speed ratio transmission comprising means operable to effect change in the speed ratio drive between the engine and vehicle; means operable to cause relief of said thrust transmission; vacuum operating means for controlling operation of said speed ratio change means, comprising, a member, and means extending between said member and said intake system for subjecting said member to vacuum in said intake system; means operable in response to driver operation of said throttle-moving-means for venting said vacuum-subjecting-means; and means responsive to pressure change in said vacuum-subjecting-means for controlling operation of said relief means.

17. In a drive for a motor vehicle having an engine; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; means operable to cause relief of said thrust-application; a follower member operably connected to said movable element and adapted for movement from a first position to a second position thereof for causing movement of said movable element from its said engaging relationship into its said disengaging relationship; a leader member movable relative to said follower member from a first position of said leader member to a second position of said leader member providing a thrust-transmitting relationship with respect to said follower member when the latter is in its said first poistion, said leader member being adapted for movement from its said second position to a third position thereof for causing movement of said follower member from its said first position to its said second position; a chamber; passage means connecting said chamber to a source of vacuum; valving means for said passage means operable to control application of vacuum to said chamber or vent said chamber through at least a portion of said passage means; a differential fluid pressure operatel member operably associated with said chamber and connected to said leader member for movement therewith such that application of vacuum to said chamber will cause said fluid pressure operated member to move said leader member from its said third position to its said first position; a spring acting to urge movement of said fluid pressure operated member in opposition to its said vacuum movement; and means operating in response to pressure differential between said chamber and said passage means for controlling operation of said relief means.

18. In a drive for a motor vehicle having an engine; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; means operable to cause relief of said thrust-application; a follower member operably connected to said movable element and adapted for movement from a first position to a second position thereof for causing movement of said movable element from its said engaging relationship into its said disengaging relationship; a chamber; passage means connecting said chamber to a source of vacuum; valving means for said passage means operable to control application of vacuum to said chamber or vent said chamber through at least a portion of said passage means; a differential fluid pressure operated member operably associated with said chamber and adapted for movement relative to said follower member from a first position of said fluid pressure operated member to a second position urging movement of said follower member from its said first position toward its said second position; a spring acting to move said fluid pressure operated member from its said first position to its said second position in response to operation of said valving means to vent said passage means; said fluid pressure operated member being returned to its said first position in response to operation of said valving means to cause application of vacuum to said chamber; and means operating in response to pressure differential between said chamber and said passage means for controlling operation of said relief means.

19. In a drive for a motor vehicle having an engine; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; means operable to cause relief of said thrust-application; a follower member operably connected to said movable element and adapted for movement from a first position to a second position thereof for causing movement of said movable element from its said engaging relationship into its said disengaging relationship; a source of vacuum; a vacuum operated member adapted for movement relative to said follower member from a first position of said vacuum operated member to a second position urging movement of said follower member from its said first position toward its said second position; means extending between said vacuum operated member and said source of vacuum for subjecting said vacuum operated member to vacuum to effect operation of said vacuum operated member from its second position to its said first position; a spring acting in opposition to said vacuum movement of said vacuum operated member such that said spring will move said vacuum operated member when said vacuum-subjecting-means is vented; valving means for said vacuum-subjecting-means operable to vent the same; and means responsive to pressure change in said vacuum-subjecting-means for controlling operation of said relief means.

20. In a drive for a motor vehicle having an engine; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; means operable to cause relief of said thrust-application; a member movable to control movement of said movable element; a second member moved as a function of movement of said movable member; a fluid-receiving chamber bounded in part by said second member such that movement of said second member produces a change in pressure of the fluid in said chamber; and means operable in response to pressure change in said chamber for controlling operation of said relief means.

21. In a drive for a motor vehicle having an engine; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; an ignition system for said engine adapted to be interrupted to relieve said thrust-application; a member movable to control movement of said movable element; a second member moved as a function of movement of said movable member; a fluid-receiving chamber bounded in part by said second member such that movement of said second member produces a change in pressure of the fluid in said chamber; an interrupter switch operable in response to movement of said movable member; a second switch; means for operating said second switch in response to pressure change in said chamber; and grounding means for interrupting said ignition system, said grounding means including said switches in series with each other.

22. In a drive for a motor vehicle having an engine; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; an ignition system for said engine adapted to be interrupted to relieve said thrust-application; a member movable to control movement of said movable element; a second member moved as a function of movement of said movable member; a fluid-receiving chamber bounded in part by said second member such that movement of said second member produces a change in pressure of the fluid in said chamber; an interrupter switch operable in response to movement of said movable member; a second switch; means for operating said second switch in response to pressure change in said chamber; a third switch operable under control of the vehicle driver; and grounding means, under control of said third switch, for interrupting said ignition system, said grounding means including said interrupter switch and said second switch in series with each other.

23. In a drive for a motor vehicle having an engine; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; means operable to cause relief of said thrust-application so as to accommodate movement of said movable element toward its said disengaging relationship; means operating to control movement of said movable element; and means operably associated with said control means, including a control switch adapted for operation between open position and closed position, for controlling operation of said relief means, said control means being adapted to effect operation of said switch from one of its said positions to the other in response to predetermined speed of movement of said movable element toward its said disengaging relationship and to effect such control on said switch that said switch will remain in its said other position by reason of said movement of said movable element at said predetermined speed but will accommodate operation of said switch automatically to its said one position in the event of, and in response to, stopping of said movable element at any point in the course of its disengaging movement less than completion of such movement thereby causing restoration of said thrust-application.

24. In a drive for a motor vehicle having an engine; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; means operable to cause relief of said thrust-application; a follower member operably connected to said movable element and adapted for movement from a first position to a second position thereof for causing movement of said movable element from its said engaging relationship into its said disengaging relationship; a leader member movable relative to said follower member from a first position of said leader member to a second position of said leader member providing a thrust-transmitting relationship with respect to said follower member when the latter is in its said first position, said leader member being adapted for movement from its said second position to a third position thereof for causing movement of said follower member from its said first position to its said second position; means operating to control movement of said leader member; and means operably associated with said leader member for effecting operation of said relief means for variable periods of time proportional to and in response to varying distances of movements of said leader member at or above a predetermined speed of travel from its said first position toward its said third position.

25. In a drive for a motor vehicle having an engine; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; an ignition system for said engine adapted to be interrupted to relieve said thrust-application; means operating to control movement of said movable element; and means operably associated with said control means for effecting interruption of said ignition system for variable periods of time proportional to and in response to varying distances of movements of said movable element at or above a predetermined speed of travel toward its said disengaging relationship.

26. In a drive for a motor vehicle having an engine; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; an ignition system for said engine adapted to be interrupted to relieve said thrust-application; a follower member operably connected to said movable element and adapted for movement from a first position to a second position thereof for causing movement of said movable element from its said engaging relationship into its said disengaging relationship; a leader member movable relative to said follower member from a first position of said leader member to a second position of said leader member providing a thrust-transmitting relationship with respect to said follower member when the latter is in its said first position, said leader member being adapted for movement from its said second position to a third position thereof for causing movement of said follower member from its said first position to its said second position; means operating to control movement of said leader member; and means operably associated with said leader member for effecting interruption of said ignition system for variable periods of time proportional to and in response to varying distances of movements of said leader member at or above a predetermined speed of travel from its said first position toward its said third position.

27. In an automotive vehicle provided with an internal combustion engine and an ignition system constituting part of the means for controlling the operation of said engine, power means for in part controlling the operation of said system including a power operated interrupter switch and a cut-out switch operable when closed to disable the engine controlling system, pressure differential operated means for closing said interrupter switch, power means for rendering said pressure differential means operative to close the interrupter switch and means for controlling the operation of said last mentioned power means.

VICTOR E. MATULAITIS.

REFERENCES CITED

The following references are of record in the file of this patent:

UNITED STATES PATENTS

| Number | Name | Date |
|---|---|---|
| 1,185,528 | Oddie | May 30, 1916 |
| 1,979,488 | Perez | Nov. 6, 1934 |
| 2,118,978 | Maybach | May 31, 1938 |
| 2,214,100 | Claytor | Sept. 10, 1940 |
| 2,225,493 | Barnes | Dec. 17, 1940 |
| 2,257,838 | Claytor | Oct. 7, 1941 |
| 2,264,001 | McKechnie | Nov. 25, 1941 |
| 2,266,598 | Hale | Dec. 16, 1941 |

FOREIGN PATENTS

| Number | Country | Date |
|---|---|---|
| 457,269 | Great Britain | Nov. 24, 1936 |